United States Patent
Okayasu et al.

(10) Patent No.: US 8,139,953 B2
(45) Date of Patent: Mar. 20, 2012

(54) SIGNAL TRANSMISSION DEVICE, SIGNAL RECEPTION DEVICE, TEST MODULE, AND SEMICONDUCTOR CHIP

(75) Inventors: Toshiyuki Okayasu, Tokyo (JP); Daisuke Watanabe, Tokyo (JP)

(73) Assignee: Advantest Corporation, Tokyo (JP)

( * ) Notice: Subject to any disclaimer, the term of this patent is extended or adjusted under 35 U.S.C. 154(b) by 1047 days.

(21) Appl. No.: 12/017,353

(22) Filed: Jan. 22, 2008

(65) Prior Publication Data
US 2008/0152357 A1 Jun. 26, 2008

Related U.S. Application Data

(63) Continuation of application No. PCT/JP2006/314426, filed on Jul. 20, 2006.

(30) Foreign Application Priority Data

Jul. 26, 2005 (JP) ................................. 2005-216043

(51) Int. Cl.
H04B 10/04 (2006.01)
(52) U.S. Cl. ........ 398/183; 398/186; 398/182; 398/192; 398/195
(58) Field of Classification Search .................. 398/140, 398/182, 183, 186, 202, 192, 195
See application file for complete search history.

(56) References Cited

U.S. PATENT DOCUMENTS

| | | | | |
|---|---|---|---|---|
| 5,315,426 A * | 5/1994 | Aoki | | 398/147 |
| 6,188,498 B1 * | 2/2001 | Link et al. | | 398/195 |
| 6,362,910 B1 * | 3/2002 | Tokita | | 398/183 |
| 6,559,995 B2 * | 5/2003 | Tokita | | 398/182 |
| 6,862,379 B2 * | 3/2005 | Howley | | 385/14 |
| 6,917,639 B2 * | 7/2005 | Ishida et al. | | 372/38.02 |
| 7,035,303 B2 * | 4/2006 | Wang | | 372/38.02 |
| 7,173,551 B2 * | 2/2007 | Vrazel et al. | | 341/144 |
| 7,197,252 B2 * | 3/2007 | Oomori | | 398/193 |
| 7,200,091 B2 * | 4/2007 | Masui et al. | | 369/59.11 |
| 7,564,759 B2 * | 7/2009 | Shirota et al. | | 369/59.12 |
| 7,603,241 B2 * | 10/2009 | Okayasu et al. | | 702/40 |
| 7,881,603 B2 * | 2/2011 | Gere | | 396/275 |
| 2003/0030873 A1 * | 2/2003 | Hietala et al. | | 359/181 |
| 2003/0035451 A1 * | 2/2003 | Ishida et al. | | 372/38.02 |

(Continued)

FOREIGN PATENT DOCUMENTS

JP 03-166835 7/1991

(Continued)

OTHER PUBLICATIONS

JP 2004-244586(submitted as an IDS)—Machine translation.*

(Continued)

*Primary Examiner* — Kenneth N Vanderpuye
*Assistant Examiner* — Hibret Woldekidan
(74) *Attorney, Agent, or Firm* — Jianq Chyun IP Office (57) ABSTRACT

There is provided a signal transmission device which transmits, in the form of an optical signal, multivalued data which shifts through three or more plurality of logical values, and includes: a light emitting element which outputs light having an intensity corresponding to a power supply current supplied thereto; a current source which is capable of supplying the light emitting element with the power supply current which has a plurality of current values corresponding to the plurality of values through which the multivalued data shifts; and a modulating section which modulates the current value of the power supply current supplied from the current source, in response to a shift of the multivalued data.

20 Claims, 10 Drawing Sheets

U.S. PATENT DOCUMENTS

| | | | |
|---|---|---|---|
| 2004/0145401 A1 | 7/2004 | Chiba et al. | |
| 2005/0152488 A1* | 7/2005 | Buckwalter et al. | 375/350 |
| 2006/0007971 A1* | 1/2006 | Sato et al. | 372/38.02 |
| 2007/0030785 A1* | 2/2007 | Masui et al. | 369/59.13 |
| 2007/0164004 A1* | 7/2007 | Matsuda et al. | 219/121.61 |
| 2008/0199185 A1* | 8/2008 | Miller et al. | 398/139 |
| 2009/0146585 A1* | 6/2009 | Huang et al. | 315/294 |
| 2009/0274471 A1* | 11/2009 | Bowler et al. | 398/197 |
| 2011/0194573 A1* | 8/2011 | Yamazaki | 372/6 |

FOREIGN PATENT DOCUMENTS

| | | |
|---|---|---|
| JP | 08-079186 | 3/1996 |
| JP | 10079547 | 3/1998 |
| JP | 2000-209150 | 7/2000 |
| JP | 2000-244586 | 9/2000 |
| JP | 2005-25768 | 1/2005 |
| JP | 2005055301 | 3/2005 |
| KR | 2005-30201 | 3/2005 |

OTHER PUBLICATIONS

"Office Action of Korean Counterpart Application", issued on May 13, 2009, p. 1-p. 3.

"Office Action of Japan Counterpart Application", issued on Mar. 29, 2011 p. 1-p. 2.

"Office Action of Japan counterpart application with partial English translation", issued on Sep. 6, 2011, p. 1-p. 5.

* cited by examiner

SIGNAL TRANSMISSION DEVICE, SIGNAL RECEPTION DEVICE, TEST MODULE, AND SEMICONDUCTOR CHIP

CROSS-REFERENCE TO RELATED APPLICATION

This is a continuation application of PCT/JP2006/314426 filed on Jul. 20, 2006, which claims priority from a Japanese Patent Application No. 2005-216043, filed on Jul. 26, 2005, the contents of which are incorporated herein by reference.

BACKGROUND

1. Technical Field

The present invention relates to a signal transmission device and signal reception device which send or receive multivalued data via optical transmission, a test device which tests a device under test, a test module and a semiconductor chip. Particularly, the present invention relates to a signal transmission device and signal reception device which perform short-distance optical transmission, a test device, a test module, and a semiconductor chip.

2. Related Art

One conventionally known method for transmitting data is optical transmission. In order to increase the amount of information to transmit through one line of optical fiber, trunk-line optical communications for long-distance data transmission use multiplexing by multivalued PSK (Phase Shift Keying), QAM (Quadrature Amplitude Modulation), WDM (Wavelength Division Multiplexing), DWDM (Dense Wavelength Division Multiplexing), etc. Digital modem circuits or wavelength multiplexing circuits that implement this method are complex and have problems of large amount of power consumption, large area occupation, high cost demand, etc. However, such multivalued transmissions or wavelength multiplexed transmissions are commonly used because lower costs are required by such transmissions than by laying a plurality of long-distance fibers in parallel.

As compared with this, short-distance transmissions of about 10 m use parallel transmissions because a cost increase that arises in a case where the number of fibers to be laid in parallel is increased is smaller than that that required by the method of increasing the amount of transmission by PSK, QAM, WDM, etc. mentioned above. However, there is a physical limitation on the number of fibers that can be laid in parallel. Hence, if a further increase in the amount of transmission is required, it is necessary that the amount of information that can be transmitted on one optical fiber be increased.

Conceivable solutions to increasing the amount of transmission per fiber are (1) increasing the transmission rate, (2) using multivalued transmissions, and (3) using wavelength multiplexed transmissions, likewise in the above-described long-distance transmissions. However, any further increase in the transmission rate is hardly available because the response speed of existing electronic circuits or opto-electric or electro-optic converter circuits has almost reached its possible maximum. Hence, multivalued transmissions or wavelength multiplexed transmissions are usually employed.

Presently, no relevant patent literature has been identified, so no indication of such literature is herein given.

However, wavelength multiplexed transmission in short-distance parallel optical transmission requires a multi-wavelength light source, a synthesizer, and a branching filter for each bit of the data transmitted. This worsens the cost performance. PSK or QAM multivalued transmission requires a wider margin on the axis of timing than the currently allowed margin which is almost as wide as possible already.

ASK (Amplitude Shift Keying) for modulating the amplitude of laser light is another possible option. However, conventional ASK uses an indirect modulation device to modulate the amplitude of laser light showing CW-mode oscillation, which is output from a laser light source. An indirect modulation device requires a large area for mounting, to make highly dense packaging of the transmission system unavailable and worsen the cost performance. As such, conventional devices are not useful in increasing the amount of transmission through optical communications.

SUMMARY

Hence, according to one aspect of the innovations included herein, an object is to provide a signal transmission device, a signal reception device, a test device, a test module, and a semiconductor chip which can overcome the above-described drawbacks of the prior art. This object is achieved by combinations set forth in the independent claims. Dependent claims define additional advantageous exemplary combinations of the present invention.

That is, according to one exemplary signal transmission device according to the first aspect related to the innovations herein, there is provided a signal transmission device that transmits, in form of an optical signal, multivalued data which shifts through three or more plurality of logical values, including: a light emitting element which outputs light having an intensity corresponding to a power supply current supplied thereto; a current source which is capable of supplying the light emitting element with the power supply current which has a plurality of current values corresponding to the plurality of values through which the multivalued data shifts; and a modulating section which modulates current value of the power supply current supplied from the current source, in response to a shift of the multivalued data.

According to one exemplary signal reception device according to the second aspect related to the innovations herein, there is provided a signal reception device that receives, in form of an optical signal, multivalued data which shifts through three or more plurality of logical values, including: a light receiving unit which receives the optical signal, and outputs a voltage corresponding to an intensity of the optical signal; a plurality of voltage comparing sections which are provided to correspond to the plurality of values through which the multivalued data shifts respectively, such that each voltage comparing section compares the voltage output from the light receiving unit with a comparison voltage corresponding to any of the logical values of the multivalued data that corresponds to that voltage comparing section; a jitter eliminating section which is provided to correspond to at least one of the voltage comparing sections, for eliminating jitter in a voltage waveform; and a decoder circuit which outputs the logical value taken by the multivalued data, based on results of comparison obtained by the respective voltage comparing sections.

According to one exemplary test device according to the third aspect related to the innovations herein, there is provided a test device which tests a device under test, including: a test head on which the device under test is set; a main section which exchanges signals with the device under test via the test head, for judging whether the device under test is good or defective; a signal transmission device which is provided in both the test head and the main section, for transmitting, in form of an optical signal, multivalued data which shifts through three or more plurality of logical values; and a signal reception device which is provided in both the test head and the main section, for receiving the optical signal, wherein the signal transmission device includes: a light emitting element which outputs light having an intensity corresponding to a power supply current supplied thereto; a current source which is capable of supplying the light emitting element with the power supply current having a plurality of current values corresponding to the plurality of values through which the multivalued data shifts; and a modulating section which modulates current value of the power supply current supplied from the current source, in response to a shift of the multivalued data.

According to one exemplary test module according to the fourth aspect related to the innovations herein, there is provided a test module which is provided in a test device for testing a device under test, and transmits, in form of an optical signal, multivalued data which shifts through three or more plurality of logical values, including: a light emitting element which outputs light having an intensity corresponding to a power supply current supplied thereto; a current source which is capable of supplying the light emitting element with the power supply current which has a plurality of current values corresponding to the plurality of values through which the multivalued data shifts; and a modulating section which modulates current value of the power supply current supplied from the current source, in response to a shift of the multivalued data.

According to one exemplary test module according to the fifth aspect related to the innovations herein, there is provided a test module which is provided in a test device for testing a device under test, and receives, in form of an optical signal, multivalued data which shifts through three or more plurality of logical values, including: a light receiving unit which receives the optical signal, and outputs a voltage corresponding to an intensity of the optical signal; a plurality of voltage comparing sections which are provided to correspond to the plurality of values through which the multivalued data shifts respectively, such that each voltage comparing section compares the voltage output from the light receiving unit with a comparison voltage corresponding to any of the logical values of the multivalued data that corresponds to that voltage comparing section; a jitter eliminating section which is provided to correspond to at least one of the voltage comparing sections, for eliminating jitter in a voltage waveform; and a decoder circuit which outputs the logical value taken by the multivalued data, based on results of comparison obtained by the respective voltage comparing sections.

According to one exemplary semiconductor chip according to the sixth aspect related to the innovations herein, there is provided a semiconductor chip which has, on a semiconductor substrate, a signal transmission device which transmits, in form of an optical signal, multivalued data which shifts through three or more plurality of logical values, wherein the signal transmission device includes: a light emitting element which outputs light having an intensity corresponding to a power supply current supplied thereto; a current source which is capable of supplying the light emitting element with the power supply current which has a plurality of current values corresponding to the plurality of values through which the multivalued data shifts; and a modulating section which modulates current value of the power supply current supplied from the current source, in response to a shift of the multivalued data.

According to one exemplary semiconductor chip according to the seventh aspect related to the innovations herein, there is provided a semiconductor chip which has, on a semiconductor substrate, a signal reception device which receives, in form of an optical signal, multivalued data which shifts through three or more plurality of logical values, wherein the signal reception device includes: a light receiving unit which receives the optical signal, and outputs a voltage corresponding to an intensity of the optical signal; a plurality of voltage comparing sections which are provided to correspond to the plurality of values through which the multivalued data shifts respectively, such that each voltage comparing section compares the voltage output from the light receiving unit with a comparison voltage corresponding to any of the logical values of the multivalued data that corresponds to that voltage comparing section; an equalizer which is provided to correspond to at least one of the voltage comparing sections, for eliminating jitter in a voltage waveform; and a decoder circuit which outputs the logical value taken by the multivalued data, based on results of comparison obtained by the respective voltage comparing sections.

The summary clause does not necessarily describe all necessary features of the embodiments of the present invention. The present invention may also be a sub-combination of the features described above.

BRIEF DESCRIPTION OF THE DRAWINGS

FIG. 10 are diagrams showing another example of the configuration of the signal transmission device 30 and the signal reception device 40, where

DESCRIPTION OF EXEMPLARY EMBODIMENTS

One aspect of the present invention will be explained below by way of exemplary embodiments. However, the embodiments below are not intended to limit the inventions set forth in the claims. All the combinations described in the embodiments are not necessarily essential to the solution of the present invention.

Figure 1:
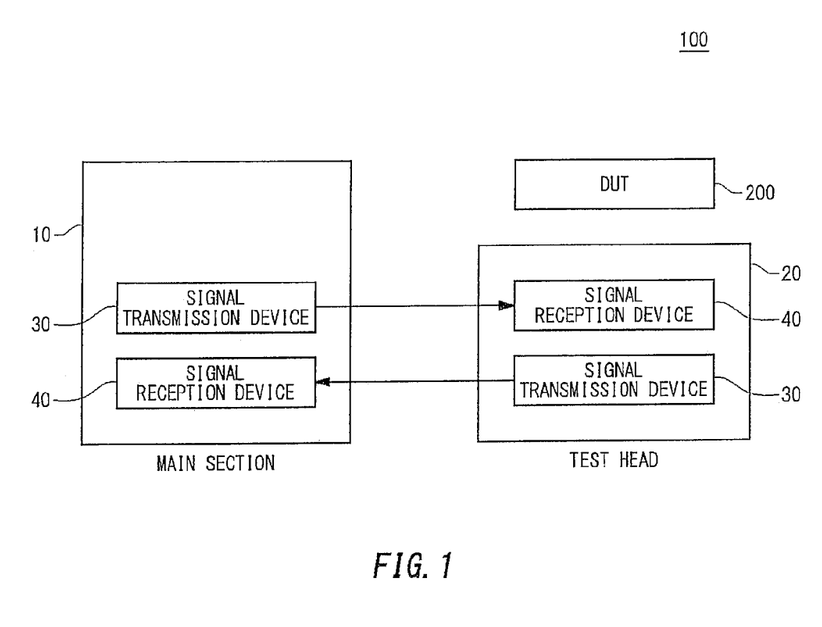
FIG. 1 is a diagram showing one example of the configuration of a test device 100 according to an embodiment of the present invention.

FIG. 1 is a diagram showing one example of the configuration of a test device 100 according to an embodiment of the present invention. The test device 100 is a device that tests a device under test 200 such as a semiconductor circuit, etc., and includes a main section 10 and a test head 20. The test head 20 receives the device under test 200 thereon, and exchanges signals with the device under test 200.

The main section 10 exchanges signals with the device under test 200 via the test head 20 to judge whether the device under test 200 is good or defective. For example, the main section 10 supplies a test signal to input to the device under test 200 to the device under test 200 via the test head 20, and receives an output signal to be output from the device under test 200 via the test head 20. The main section 10 judges whether the device under test 200 is good or defective based on the output signal.

The main section 10 and the test head 20 each include both a signal transmission device 30 and a signal reception device 40 for performing signal transmission. The signal transmission devices 30 and the signal reception devices 40 transmit optical signals via a plurality of optical fibers that connect the main section 10 and the test head 20. The interval between the main section 10 and the test head 20 is a short distance equal to or smaller than, for example, 10 m. Thus, a plurality of optical fibers can be laid in parallel at a low cost.

In the present example, the main section 10 and the test head 20 both include the signal transmission device 30 and the signal reception device 40 in order to transmit signals therebetween. However, the test device 100 may built up of test modules installed at desired locations, which include at least one of the signal transmission device 30 and the signal reception device 40. For example, the test modules may be placed at desired locations between which signal transmission on an optical fiber is possible.

Figure 2:
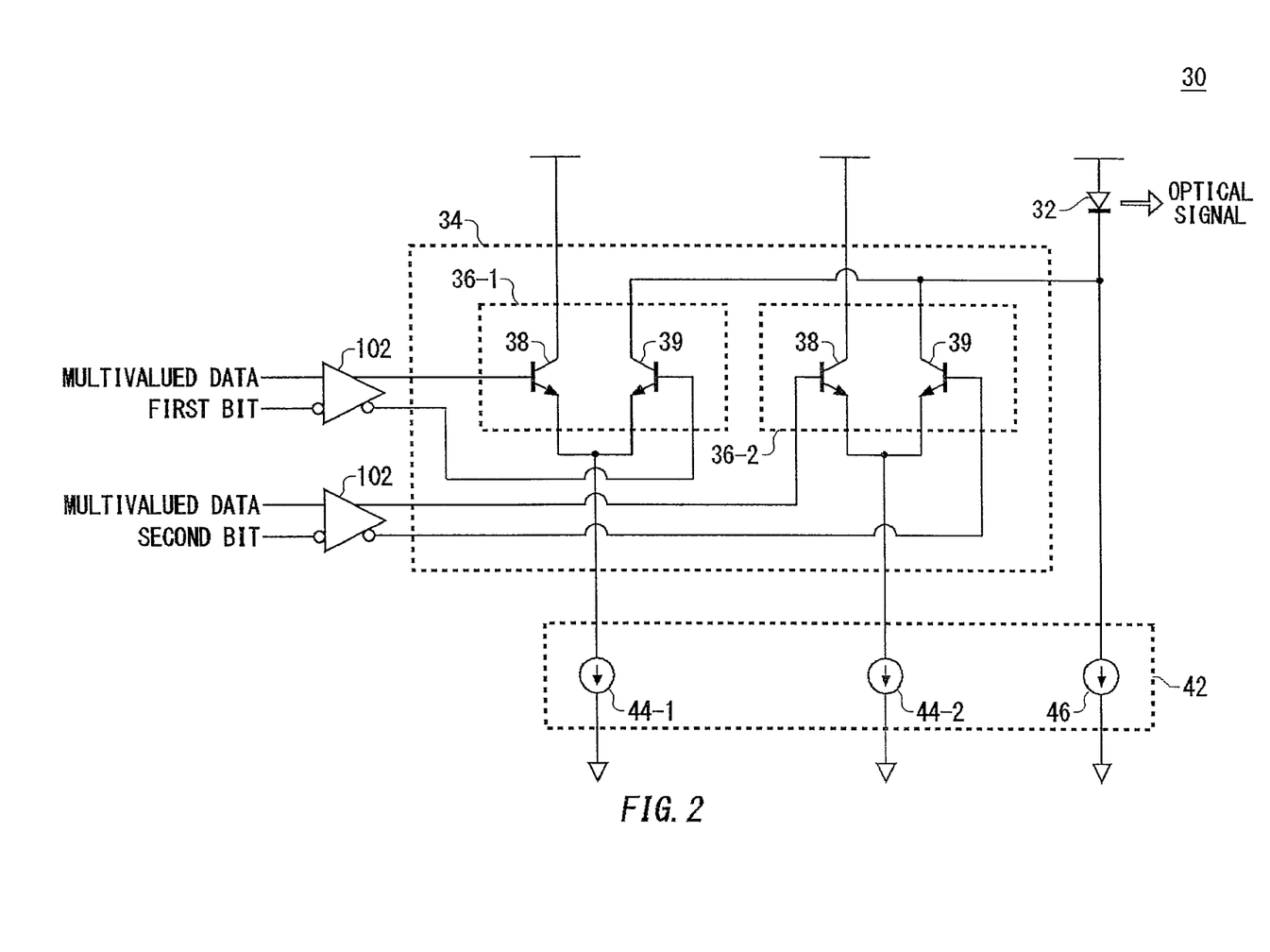
FIG. 2 is a diagram showing one example of the configuration of a signal transmission device 30.

FIG. 2 is a diagram showing one example of the configuration of the signal transmission device 30. The signal transmission device 30 included in the main section 10 and that included in the test head 20 have the same configuration. The signal transmission device 30 includes a light emitting element 32, a current source 42, and a modulating section 34. The signal transmission device 30 of the present example modulates the amplitude of laser light output from the light emitting element 32 by modulating the power supply current to be supplied to the light emitting element 32 according to the data to transmit, and sends out multivalued data which shifts through three or more plurality of logical values, in the form of an optical signal.

The light emitting element 32 outputs laser light having intensity according to the power supply current supplied thereto. The light emitting element 32 is, for example, a laser diode. The current source 42 is a current source which can supply the light emitting element 32 with a power supply current having a plurality of current values corresponding to the plurality of values through which multivalued data shifts. For example, in a case where multivalued data can take four values, the current source 42 is configured to be capable of supplying the light emitting element 32 with a current source having four current values.

In the present example, the current source 42 includes a bias current source 46, and a plurality of bit current sources (44-1 and 44-2, hereinafter collectively denoted by 44). The bias current source 46 applies a bias current to the light emitting element 32 beforehand to reduce any delay caused by the light emitting element 32 in emitting light. Each logical value taken by multivalued data to be input to the signal transmission device 30 as data to transmit is represented by a multi-bit digital value. The number of bit current sources 44 included in the current source 42 is in conjunction with the number of bits to be used to represent the multivalued data to be input. For example, in a case where multivalued data is represented by two bits, the current source 42 includes two bit current sources 44. The present example will explain a two-bit case, but multivalued data may be represented by a larger number of bits.

Each bit current source 44 generates a current corresponding to the bit position of any bit of a digital value taken by multivalued data that corresponds to that bit current source 44. In the present example, the bit current source 44-1 is provided to correspond to the first bit of multivalued data, and generates a predetermined current I1. The bit current source 44-2 is provided to correspond to the second bit of multivalued data, and generates a current I2 having a current value about twice as large as that of the current I1. Here, the second bit of multivalued data is a bit of a higher order than the first bit.

The modulating section 34 modulates the current value of the power supply current to be supplied from the current source 42 to the light emitting element 32 in response to a shift of the logical value taken by multivalued data. In the present example, modulation of the power supply current is performed by switching between supplying and not supplying the light emitting element 32 with the currents generated by the plurality of bit current sources 44, in response to a shift of the logical value taken by multivalued data. For example, the modulating section 34 receives a multi-bit digital input representing multivalued data from input sections 102. The modulating section 34 superimposes the current generated by the bit current source 44 which corresponds to such a bit of the digital input that has a value 1, on the power supply current. The modulating section 34 does not superimpose the current generated by the bit current source 44 which corresponds to such a bit of the multivalued data that has a value 0, on the power supply current. By this control, the modulating section 34 can modulate the current value of the power supply current to be supplied from the current source 42 to the light emitting element 32 in response to a shift of the logical value taken by the multivalued data.

The modulating section 34 includes some number of current control switches (36-1 and 36-2, hereinafter collectively denoted by 36) that corresponds to the number of the bits representing the digital value taken by the multivalued data. In the present example, with two bits used to represent multivalued data, the modulating section 34 includes two current control switches 36. The current control switches 36 are provided to correspond to different one of the bits of the multivalued data from each other, and in accordance with the logical value of the corresponding bits, switch between supplying and not supplying the light emitting element 32 with the currents generated by the corresponding bit current sources 44 by superposing the currents on the power supply current. In the present example, in a case where the logical value of the corresponding bit is 1, each current control switch 36 supplies the light emitting element 32 with the current generated by the corresponding bit current source 44. In a case where the logical value of the corresponding bit is 0, each current control switch 36 does not supply the light emitting element 32 with the current generated by the corresponding bit current source 44.

Each current control switch 36 may control the current by way of a transistor provided between the light emitting element 32 and the bit current source 44, or may control the current by way of differentially paired transistors. The current control switch 36 of the present example includes differentially paired transistors (38, 39), which are provided between the light emitting element 32 and the bit current source 44. Each current control switch 36 inputs a voltage corresponding to the logical value of the corresponding bit of the multivalued data to the base terminal of the differentially paired transistors (38, 39), thereby to control whether to apply the current generated by the corresponding bit current source 44 to the light emitting element 32.

With this configuration for controlling the amplitude of the laser light to multiple values, it is possible to perform optical transmissions for a large amount of data. Further, since this configuration modulates the amplitude of the laser light not by optical modulation but by direct modulation that modulates the power supply current, no optical modulator circuit is required so that the device area can be reduced.

Figure 3:
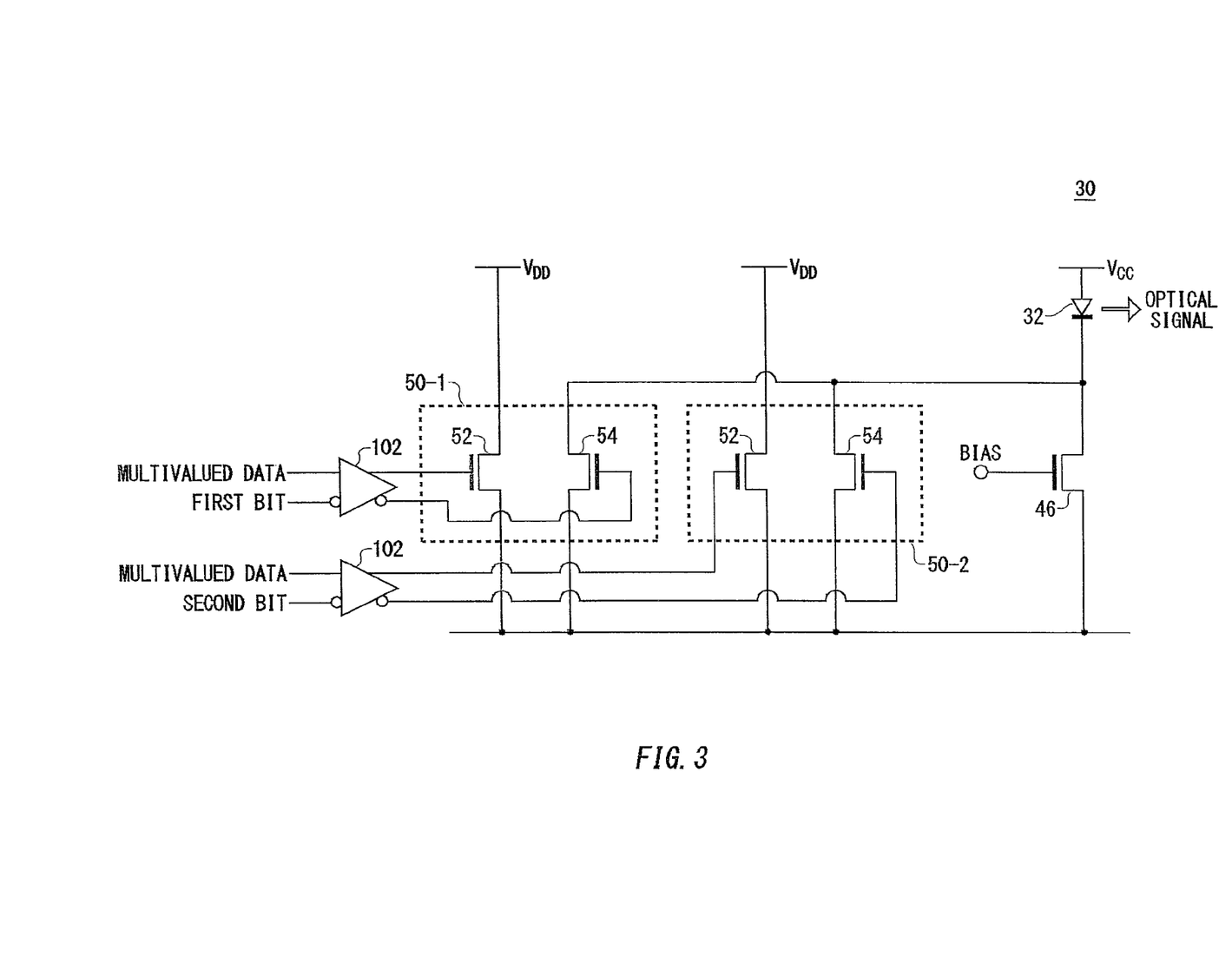
FIG. 3 is a diagram showing another example of the configuration of the signal transmission device 30.

FIG. 3 is a diagram showing another example of the configuration of the signal transmission device 30. The signal transmission device 30 of the present example includes a plurality of bit current sources (50-1 and 50-2, hereinafter collectively denoted by 50), a bias current source 46, and a light emitting element 32. The light emitting element 32 is identical with the light emitting element 32 explained with reference to FIG. 2.

Each bit current source 50 includes differentially paired transistors (52, 54) likewise the current control switch 36 explained with reference to FIG. 2. The bias current source 46 includes a transistor provided between the light emitting element 32 and a ground potential, and supplies the light emitting element 32 with a power supply current corresponding to a bias voltage supplied to its gate terminal. The transistor included in the bit current sources 50 and the bias current source 46 is a MOSFET. By using a MOSFET for each transistor, it is possible to form the drive circuit for the light emitting element 32 into a monolithic IC chip.

The signal transmission device 30 and the signal reception device 40 may be formed on a semiconductor chip. For example, such a semiconductor chip may have at least one of the signal transmission device 30 and the signal reception device 40 on a semiconductor substrate. Alternatively, such a semiconductor chip may have only part of the configuration of the signal transmission device 30 and the signal reception device 40 thereon.

Each transistor 52 is provided between a bus line to which a predetermined drain voltage $V_{DD}$ is applied and a ground potential, and supplied with a gate voltage corresponding to the logical value of the corresponding bit of the multivalued data. Each transistor 54 is provided between the light emitting element 32 and a ground potential, and supplied with a voltage obtained by inverting the gate voltage supplied to the transistor 52. That is, the transistor 54 superimposes a current corresponding to the logical value of the corresponding bit of the multivalued data on the power supply current for the light emitting element 32, and the transistor 52 controls the current consumed by the differentially paired transistors to be constant.

In the signal transmission device 30 of the present example, the bit current sources 50 serve both as the bit current sources 44 and the current control switches 36 explained with reference to FIG. 2. Therefore, the circuit size can be reduced. The current generated by each bit current source 50 is equal to the current generated by the bit current source 44 explained with reference to FIG. 2. For example, the bit current source 50-2 generates a current twice as large as that that is generated by the bit current source 50-1. Hence, the bit current source 50-2 may include transistors whose gate width is twice as large as that of the transistors of the bit current source 50-1, or may include two transistors 52 in parallel and two transistors 54 in parallel.

Figure 4:
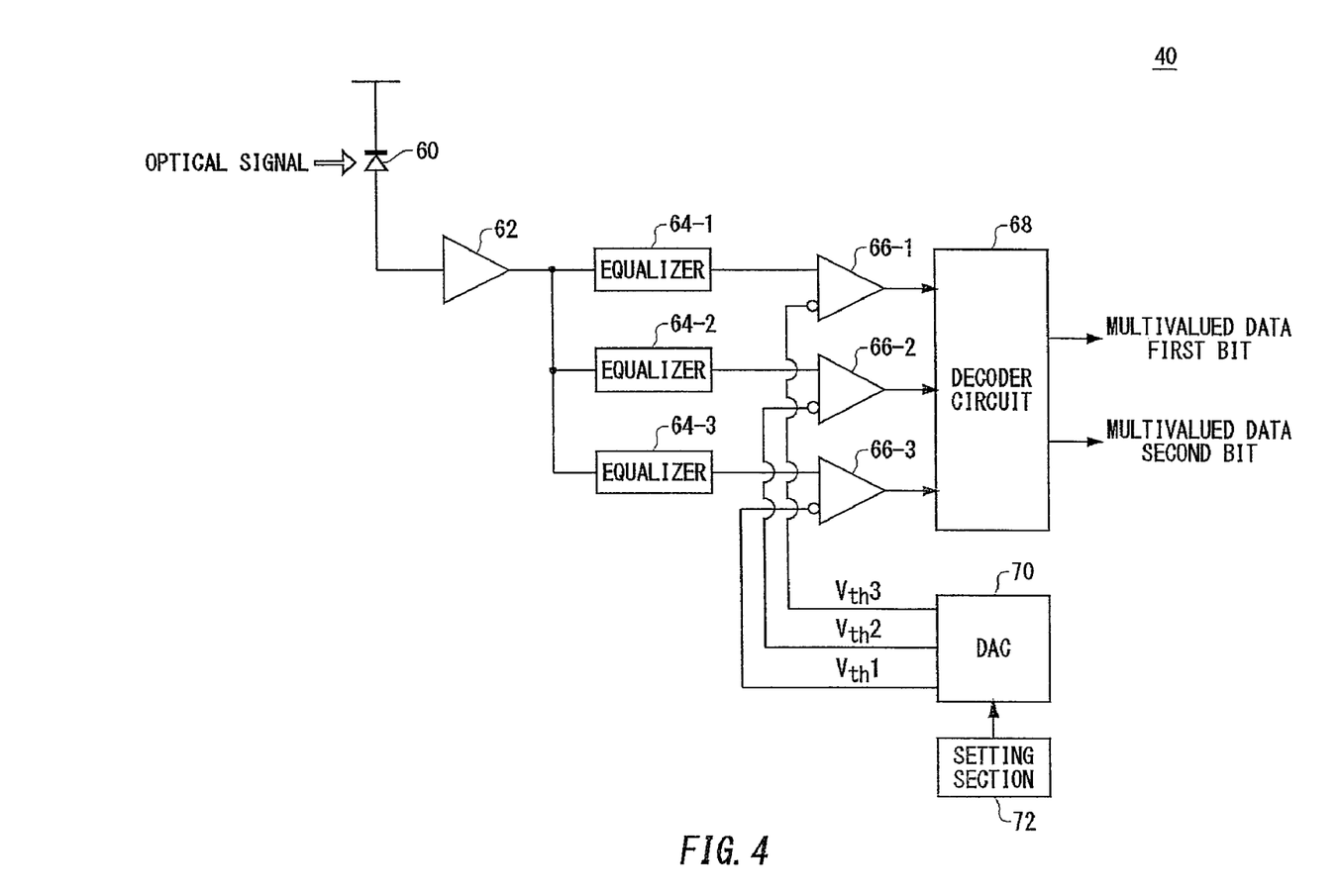
FIG. 4 is a diagram showing one example of the configuration of a signal reception device 40.

FIG. 4 is a diagram showing one example of the configuration of the signal reception device 40. The signal reception device 40 provided in the main section 10 and that provided in the test head 20 have the same configuration. The signal reception device 40 includes a light receiving element 60, a converter circuit 62, a plurality of equalizers (64-1 to 64-3, hereinafter collectively denoted by 64), a plurality of voltage comparing sections (66-1 to 66-3, hereinafter collectively denoted by 66), a decoder circuit 68, a DAC 70, and a setting section 72. The signal reception device 40 of the present example receives an optical signal sent by the signal transmission device 30 and outputs multivalued data carried on the optical signal. In the present example, the explanation will be about a case where the signal transmission device 30 sends a four-valued optical signal.

The light receiving element 60 receives a multivalued optical signal sent out from the signal transmission device 30, and generates a reception responsive current corresponding to the intensity of the optical signal. The light receiving element 60 is, for example, a photo-diode. The converter circuit 62 converts the reception responsive current generated by the light receiving element 60 into a voltage. The converter circuit 62 may be an impedance converter circuit (TIA) that outputs a voltage corresponding to a current supplied thereto.

The DAC 70 outputs a plurality of threshold voltages (Vth 1, Vth 2, and Vth 3) in accordance with a plurality of voltage data supplied from the setting section 72. The setting section 72 outputs a plurality of voltage data which are correlated with the plurality of values through which the multivalued data shifts, and based on which the value taken by the multivalued data is determined. For example, the setting section 72 outputs voltage data indicative of the mid value between voltages levels corresponding to the values taken by the multivalued data. For example, assuming that the voltage levels corresponding to the respective values taken by the multivalued data by its shifting are 0, 1, 2, and 3V, the setting section 72 outputs voltage data indicative of 0.5, 1.5, and 2.5V respectively.

Each voltage comparing section 66 is provided to correspond to a plurality of values taken by the multivalued data. That is, the voltage comparing section 66 is provided such that it can distinguish between a plurality of values taken by the multivalued data. For example, in a case where the multivalued data shifts through four values, three voltage comparing sections 66 are necessary to distinguish among the four values. Each voltage comparing section 66 compares the level of the voltage output from the converter circuit 62 with the level of a comparison voltage corresponding to the logical values assigned to that voltage comparing section 66 among the logical values taken by the multivalued data.

The decoder circuit 68 outputs the logical value of the multivalued data based on the comparison results obtained by the respective voltage comparing sections 66. In the present example, based on these comparison results, the decoder circuit 68 outputs the logical value taken by the multivalued data on the basis of one bit at a time for the respective bits of the multivalued data.

The equalizers 64 are provided to correspond to at least one voltage comparing section 66, eliminate any jitter in the voltage waveform output from the converter circuit 62, and supply the jitter-eliminated voltage to the corresponding voltage comparing section 66. For example, the equalizers 64 may output the voltage output from the converter circuit 62 by making the trailing edge of the voltage waveform steep. The equalizers 64 may be a circuit that performs operation for convolving a pre-given waveform with the voltage waveform output from the converter circuit 62. The pre-given waveform is a waveform that makes the width across which the trailing edge of a voltage waveform slopes smaller by way of convolution operation.

With this configuration, the signal reception device 40 can receive the multivalued data transmitted in the form of an optical signal. Since the light emitting element 32, which may be a laser diode or the like, outputs a waveform whose trailing edge is not steep, the optical signal cannot avoid acquiring a jitter corresponding to the characteristic of the light emitting element 32. The signal reception device 40 of the present example can have the jitter in the voltage waveform output from the converter circuit 62 reduced, and therefore can demodulate the optical signal precisely.

Further, the laser diode or the like as the light emitting element 32 has a current-light output characteristic, which is not the ideal linear characteristic. Hence, the jitter in the optical signal increases in proportion to the amplitude of the optical signal. Therefore, the equalizer 64 may be provided for at least one of the plurality of voltage comparing sections 66, which is selected in the descending order of the levels of the comparison voltages assigned to the voltage comparing sections 66. Alternatively, all the voltage comparing sections 66 may be provided with equalizers 64.

Figure 5:
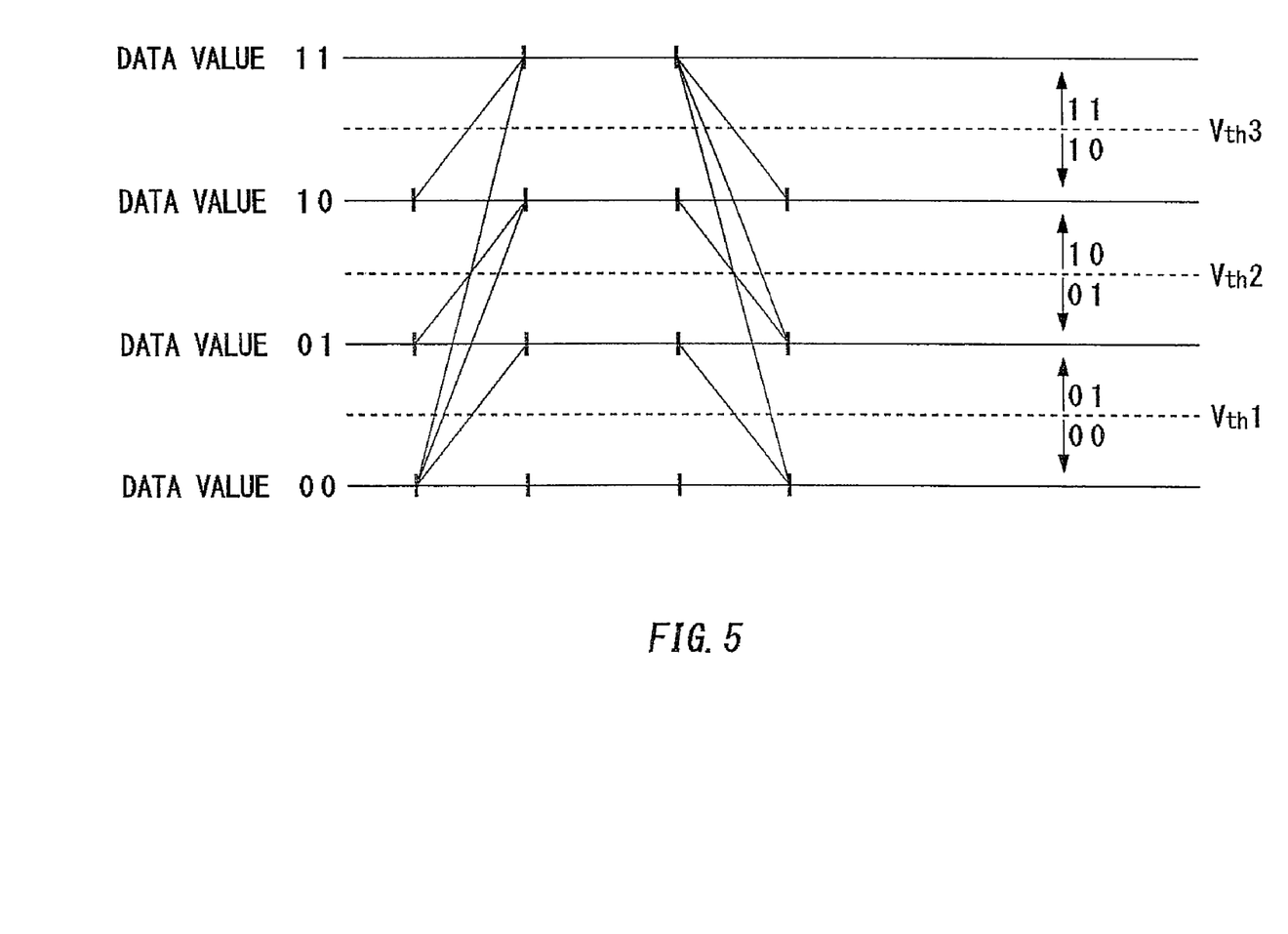
FIG. 5 is a diagram showing examples of threshold voltages output from a DAC 70.

FIG. 5 is a diagram showing examples of threshold voltages output from the DAC 70. The vertical axis of FIG. 5 represents voltage level. In a case where the logical value of the multivalued data shifts through four values, the voltage level of the voltage waveform output from the converter circuit 62 shifts through four voltage levels as shown in FIG. 5. The DAC 70 outputs threshold voltages (Vth1, Vth2, and Vth3) having substantially the mid value between the voltage levels. The voltage comparing sections 66 compare these threshold voltages with the voltage output from the converter circuit 62. Such control enables the discrimination among multiple logical value.

Figure 6:
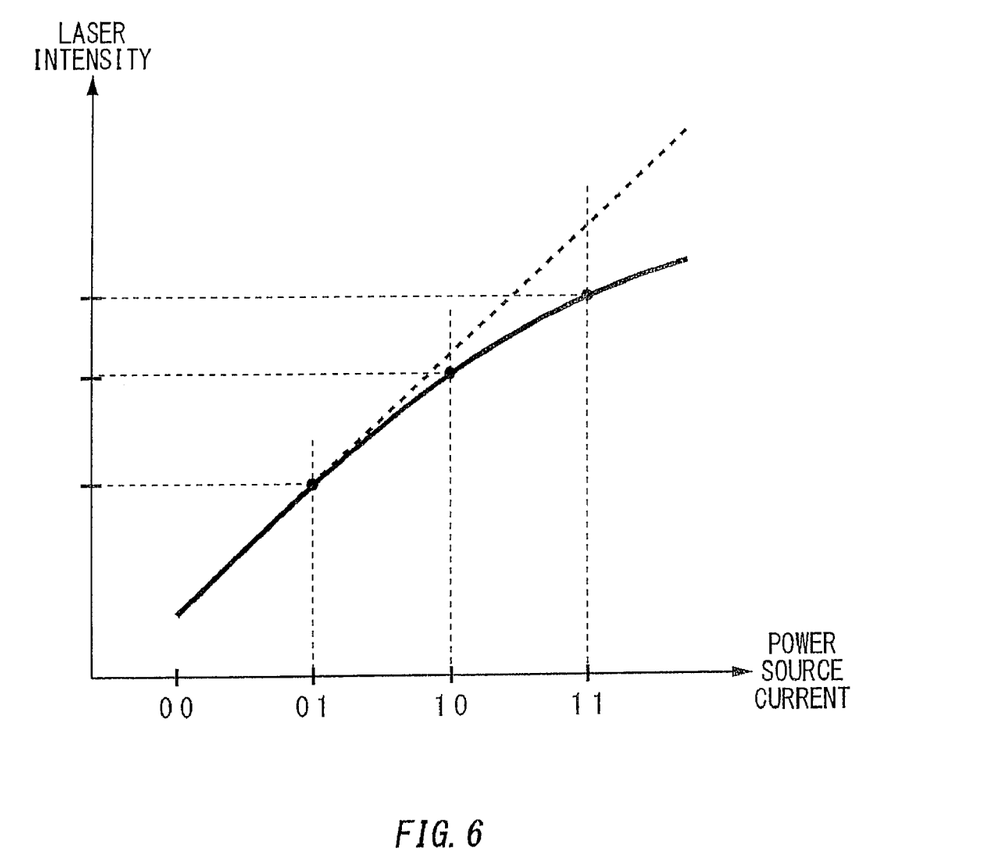
FIG. 6 is a diagram showing one example of "power supply current vs. output intensity" characteristic of a light emitting element 32.

FIG. 6 is a diagram showing one example of "power supply current vs. output intensity" characteristic of the light emitting element 32. The horizontal axis of FIG. 6 represents power supply current supplied to the light emitting element 32, and the vertical axis represents intensity of the laser light output from the light emitting element 32. The characteristic of the light emitting element 32, which may be a laser diode or the like, shows some non-linear portion as illustrated in FIG. 6. Because of this, the intensities of laser light output in accordance with the respective logical values (00, 01, 10, 11) taken by the multivalued data may not necessarily be at regular intervals on the vertical axis.

For example, in demodulating multivalued data which is obtained by modulating the amplitude of an electric signal, the levels of the threshold voltages are set at regular intervals. However, in such a case as the present example where multivalued data is obtained by modulation of the amplitude of laser light through modulation of a power supply current supplied to the light emitting element 32, precise demodulation may not be available if the threshold voltages are set at regular intervals.

Hence, it is preferable that the DAC 70 output threshold voltages that match the "power supply current vs. output intensity" characteristic of the light emitting element 32. For example, the setting section 72 may pre-store voltage data that match the "power supply current vs. output intensity" characteristic of the light emitting element 32. Alternatively, the current source 42 of the signal transmission device 30 may generate power supply currents that match this characteristic of the light emitting element 32.

Alternatively, such voltage data may be pre-set by the user who measures this characteristic, or the signal reception device 40 may measure the characteristic to allow the setting section 72 to calculate voltage data. In the case where the signal reception device 40 measures the characteristic, it causes the power supply current generated by the current source 42 of the signal transmission device 30 to successively change. Then, the signal reception device 40 successively changes the voltage data to be supplied to the voltage comparing sections 66 for each level of the successively changing power supply current and determines the voltage level of the voltage waveform output from the converter circuit 62 with respect to that level of the power supply current, thereby to measure that characteristic.

When controlling the threshold voltages to be output from the DAC 70, the setting section 72 calculates, based on that characteristic, the voltage levels of the voltages to be input to the voltage comparing sections 66, which voltage levels correspond respectively to the logical values taken by the multivalued data, and sets the mid values between these voltage levels as the threshold voltages respectively.

Figure 7:
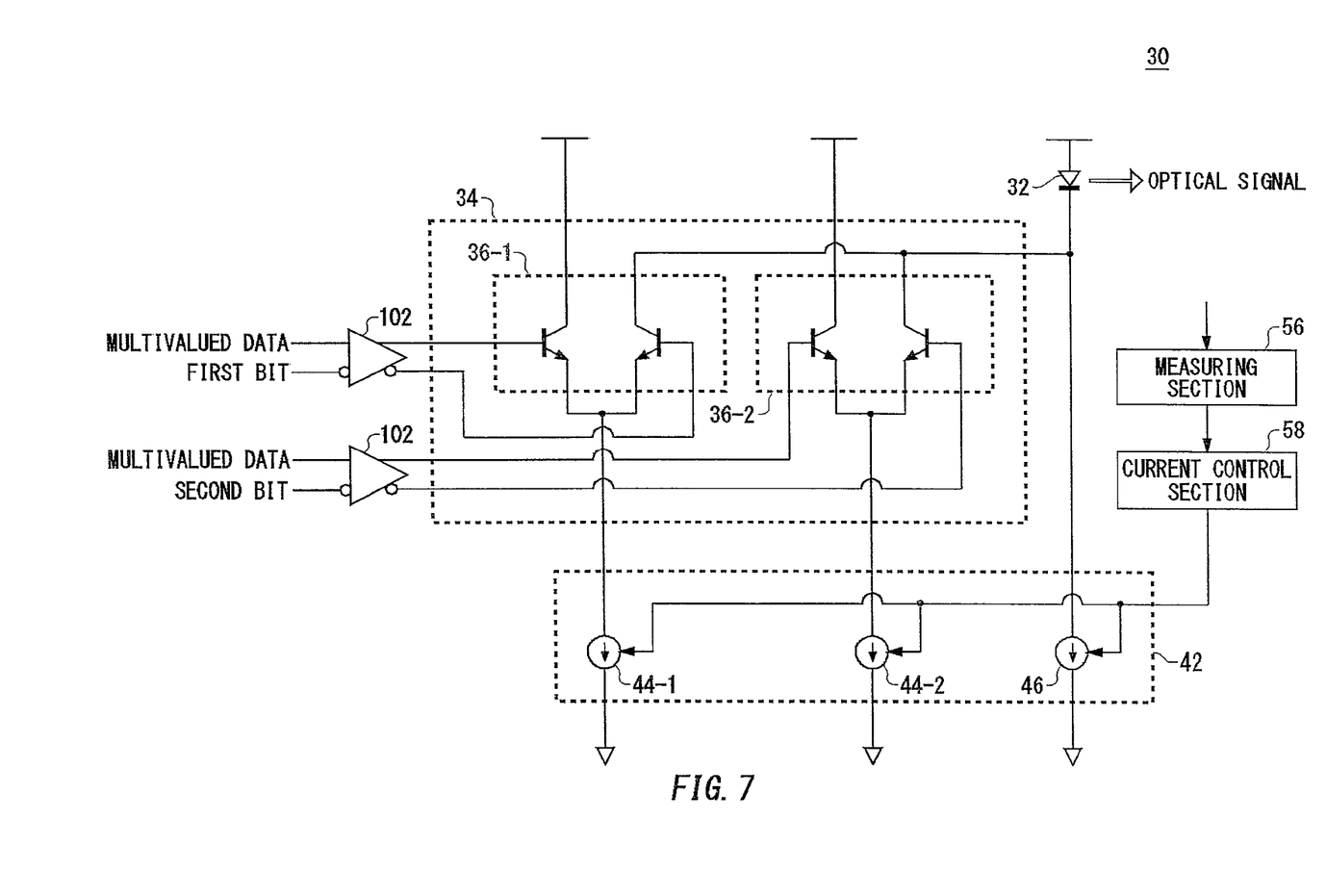
FIG. 7 is a diagram showing another example of the configuration of the signal transmission device 30.

FIG. 7 is a diagram showing another example of the configuration of the signal transmission device 30. The signal transmission device 30 of the present example includes a measuring section 56 and a current control section 58 in addition to the configuration of the signal transmission device 30 explained with reference to FIG. 2. The measuring section 56 measures the "power supply current vs. output intensity" characteristic explained with reference to FIG. 6. For example, the measuring section 56 causes the power supply current generated by the current source 42 to successively change, and measures the intensity of the optical signal output from the light emitting element 32 with respect to each level of the successively changing power supply current, as explained with reference to FIG. 6. Alternatively, the signal reception device 40 may function as the measuring section 56 as explained with reference to FIG. 6.

The current control section 58 controls the current value of the current generated by each bit current source 44 based on the "power supply current vs. output intensity" characteristic measured by the measuring section 56. For example, the current control section 58 may control each bit current source 44 such that the intensity of the laser light changes substantially in proportion to the amount by which the logical value taken by the multivalued data shifts.

Figure 8:
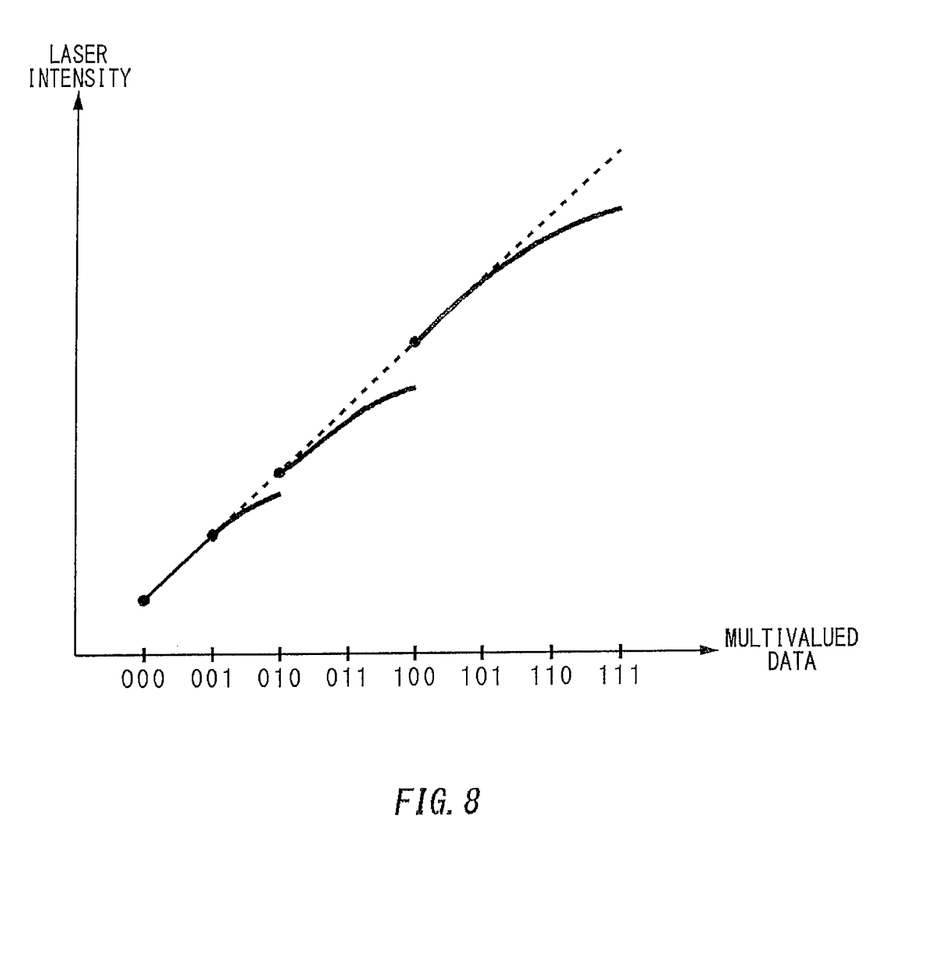
FIG. 8 is a diagram showing one example of relationship of intensities of laser light with respect to respective logical values taken by multivalued data, obtained in a case where a current control section 58 controls a bit current source 44.

FIG. 8 is a diagram showing one example of the relationship of the intensity of laser light with respect to each logical value taken by the multivalued data, obtained when the current control section 58 controls the bit current sources 44. The present example will explain the case where the multivalued data is represented by three bits. As explained with reference to FIG. 7, the current control section 58 controls the current generated by each bit current source 44 such that the intensity of the laser light changes substantially in proportion to the amount by which the logical value taken by the multivalued data shifts. For example, the current control section 58 controls the currents generated by the respective bit current sources 44 such that the intensities shown by the laser light when the currents generated by the respective bit current sources 44 are each solely superimposed on the power supply current (that is, when the logical value taken by the multivalued data is 001, 010, and 100) can be approximated by a substantially linear line, as shown in FIG. 8. By this control, laser light having intensities that are substantially in proportion to the amount by which each logical value taken by the multivalued data shifts can be generated.

The current control section 58 may alternatively set the currents to be generated by the respective bit current sources 44 within the range in which the "power supply current vs. output intensity" characteristic of the light emitting element 32 can be approximated by a linear line. In this case, the current control section 58 controls the respective bit current sources 44 such that the current value of a bit current source 44 is as large as that of another bit current source 44, the current value of yet another bit current source 44 is twice as large as that of the previous another bit current source 44, the current value of still another bit current source 44 is four times as large as the previous yet another bit current source 44, . . . . In this case, the DAC 70 of the signal reception device 40 generates threshold voltages which are substantially at regular intervals, suitably for the output intensities corresponding to the respective logical values.

Figure 9:
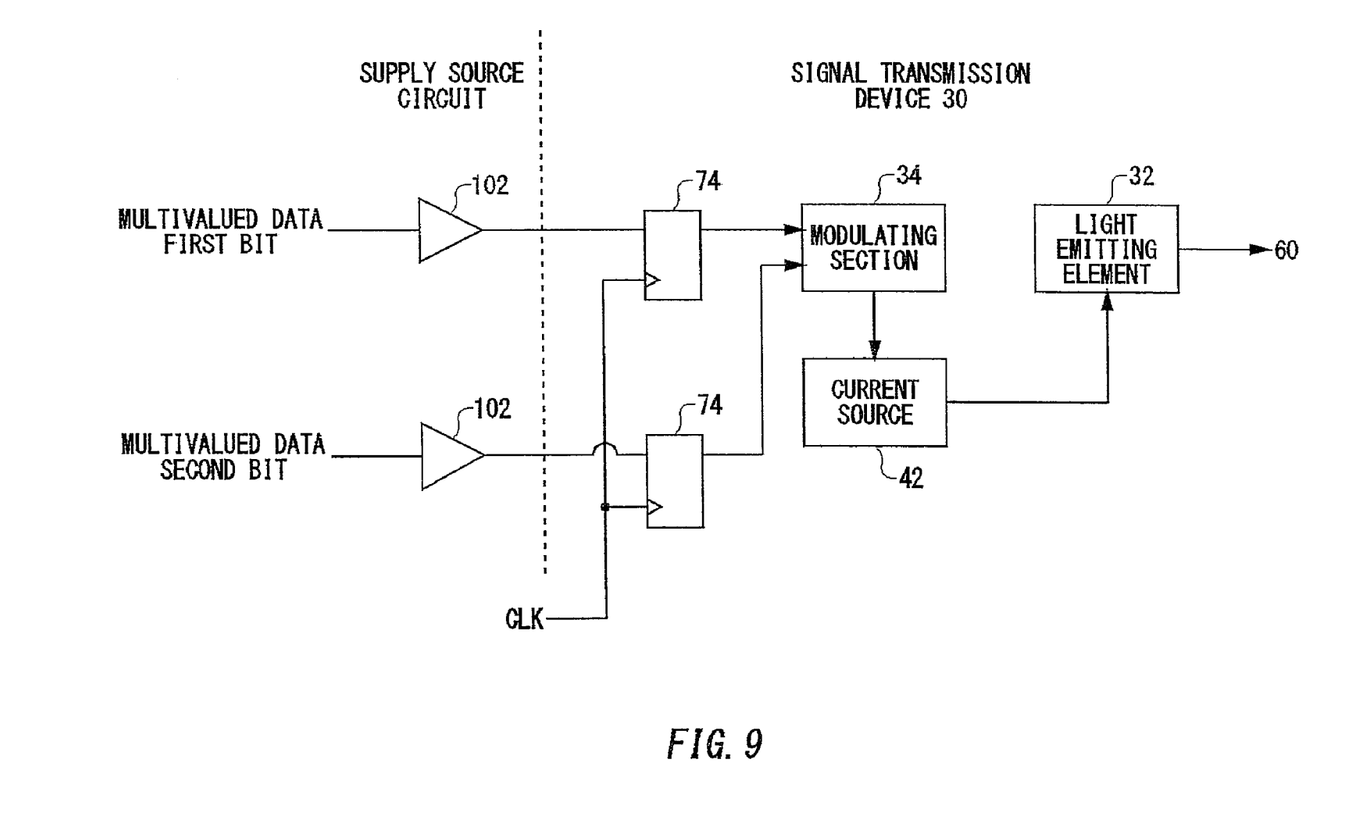
FIG. 9 is a diagram showing another example of the configuration of a signal transmission device 30.

FIG. 9 is a diagram showing another example of the configuration of the signal transmission device 30. The signal transmission device 30 of the present example includes a plurality of flip flops 74 in addition to the configuration of the signal transmission device 30 explained with reference to FIG. 2, FIG. 3, or FIG. 7. The plurality of flip flops 74 are provided at positions close to the modulating section 34 such that they correspond respectively to the bits of a digital input supplied from the input sections 102 as the supply source circuits. The flip flops 74 are supplied with the same clock, and receive corresponding bit signals and input them to the modulating section 34 in response to the clock. With this configuration, the flip flops 74 function as skew adjusting sections which eliminate any skew between the paths through which the respective bits of the multivalued data are transmitted to the modulating section 34. Here, a skew between the paths is the difference between the lengths of transmission delays that occur after the signal transmission device 30 receives the respective bit data of the multivalued data until the bit data are transmitted to the modulating section 34 on the paths through which the respective bit data are transmitted.

In a case where a skew occurs between the paths through which the respective bits are transmitted, the timings at which the respective bit current sources 44 are controlled become asynchronous with each other. Therefore, distortion or glitch might occur in the waveform of the power supply current to be supplied to the light emitting element 32. As a result, distortion or glitch might occur in the waveform of the optical signal to be output from the light emitting element 32. Since the signal transmission device 30 of the present example includes the flip flops 74 which can make the timings to input the respective bit signals synchronous, the signal transmission device 30 can reduce distortion or glitch in the waveform of the optical signal.

Figure 10A:
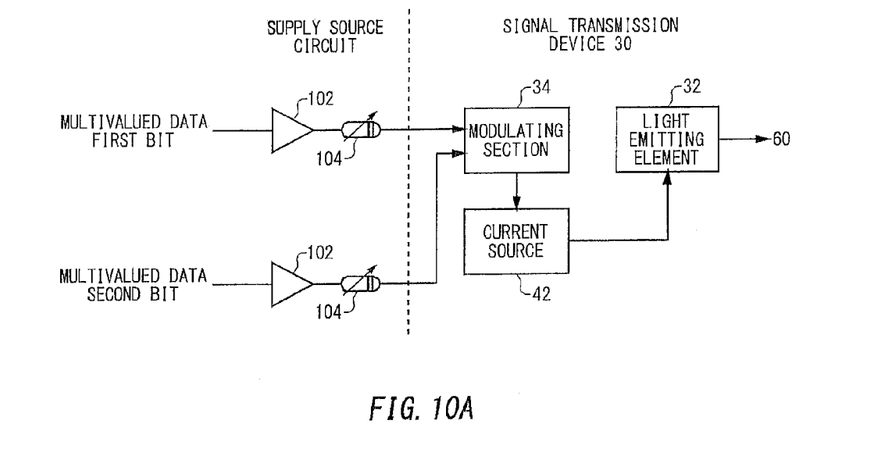
FIG. 10(a) shows the configuration of the signal transmission device 30 and FIG. 10(b) shows the configuration of the signal reception device 40.
Figure 10B:
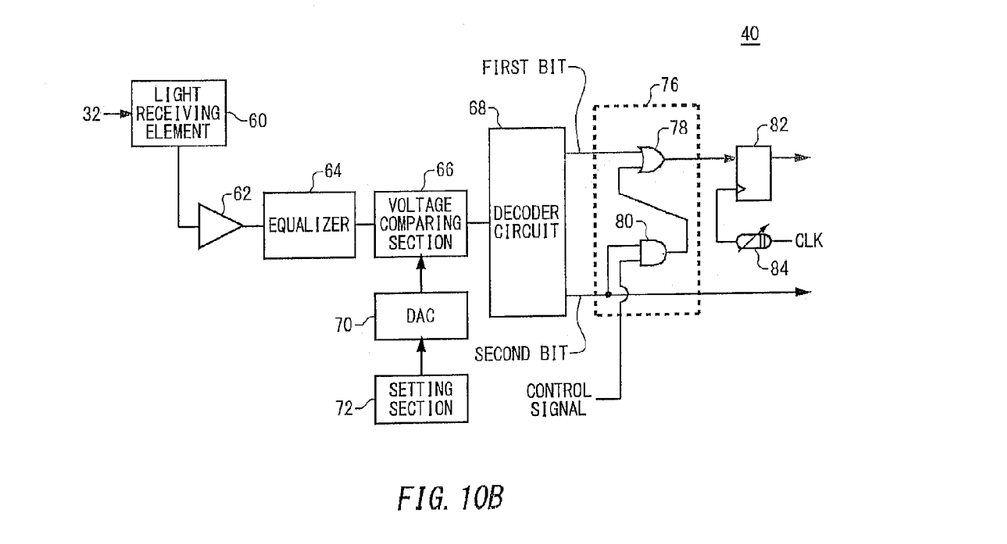

FIG. 10 are diagrams showing another example of the configuration of the signal transmission device 30 and the signal reception device 40. FIG. 10(a) shows the configuration of the signal transmission device 30 and FIG. 10(b) shows the configuration of the signal reception device 40.

The signal transmission device 30 of the present example includes a plurality of variable delay circuits 104 in addition to the configuration of the signal transmission device 30 explained with reference to FIG. 2, FIG. 3, or FIG. 7. The plurality of variable delay circuits 104 are provided to respectively correspond to the bits of a digital input supplied from the input sections 102 as the supply source circuits. Each variable delay circuit 104 receives the corresponding bit signal and delays the received bit signal in order to reduce skew on the transmission path. With this configuration, skew between the paths through which the respective bits are transmitted can be reduced.

While it is difficult for the signal transmission device 30 shown in FIG. 9 to eliminate a skew in a case where the length of the skew is larger than one cycle of the clock supplied to the flip flops 74, the signal transmission device 30 of the present example, which uses the variable delay circuits 104 for reducing a skew, can reduce the skew within the range in which the variable delay circuits 104 can vary the delay length. In the present example, the variable delay circuit 104 is provided for each path through which the bit signal is transmitted, but in other examples, no variable delay circuit 104 may be provided for the path that serves as the reference. The delay length of each variable delay circuit 104 is set in accordance with a skew measured in advance.

The signal reception device 40 includes a multiplexer 76, a flip flop 82, and a variable delay circuit 84 in addition to the configuration of the signal reception device 40 explained with reference to FIG. 4. The multiplexer 76, the flip flop 82, and the variable delay circuit 84 function as a skew measuring section which measures the difference between the lengths of transmission delays on the respective transmission paths described above, of the signal transmission device 30.

The multiplexer 76 includes an OR circuit 78 and an AND circuit 80, and selects any one of the bit signals of the digital output from the decoder circuit 68, and outputs the selected bit signal. The AND circuit 80 outputs the logical product of the signal representing the second bit output from the decoder circuit 68 and a control signal. The OR circuit 78 outputs the logical sum of the signal representing the first bit output from the decoder circuit 68 and the signal output from the AND circuit 80.

For a skew to be measured, the supply source circuits first output a pattern "0101 . . . " as the first bit of multivalued data, and a pattern "0000 . . . " as the second bit of the multivalued data. And a control signal fixed at L level is input to the multiplexer 76. By this control, the multiplexer 76 selects and outputs the first bit of the multivalued data. Then, the flip flop 82 acquires the signal output from the multiplexer 76 in response to a clock delayed by the variable delay circuit 84. By successively changing the delay length in the variable delay circuit 84, it is possible to detect the phase cycle at which the logical value taken by the first bit of the multivalued data shifts.

Next, the supply source circuits output a pattern "000 . . . " as the first bit of the multivalued data, and a pattern "0101 . . . " as the second bit of the multivalued data. A control signal fixed at H level is input to the multiplexer 76. By this control, the multiplexer 76 selects and outputs the second bit of the multivalued data. Then, the flip flop 82 acquires the signal output from the multiplexer 76 in response to a clock delayed by the variable delay circuit 84. By successively changing the delay length in the variable delay circuit 84, it is possible to detect the phase cycle at which the logical value taken by the second bit of the multivalued data shifts. Then, the delay lengths in the variable delay circuits 104 are set according to the difference between the phase cycle at which the logical value taken by the first bit shifts and the phase cycle at which the logical value taken by the second bit shifts. The test device 100 may further include a control section which controls the delay length in the variable delay circuit 84 based on the thusly measured difference between the lengths of the transmission delays. By this control, skew can be reduced. In a case where ordinary data transmissions are to be performed after the delay lengths of the variable delay circuits 104 are set, a control signal fixed at L level is input to the multiplexer 76.

Although some aspects of the present invention have been described by way of exemplary embodiments, the technical scope of the present invention is not limited to the scope of disclosure of the above-described embodiments. Various changes or substitutions can be made upon the above-described embodiments. It is obvious from the claims that any embodiments that include such changes or substitutions can also be included in the technical scope of the present invention.

As obvious from the above description, according to the embodiments of the present invention, it is possible to easily transmit multivalued data optically, with the use of a small-sized device implementing direct modulation, not with the use of an indirection modulation device implementing indirect modulation. In short-distance optical transmissions like those between the main section and test head of the test device, loss on the optical fiber is very small. Hence, the present invention can be effectively utilized particularly in short-distance optical transmissions with sufficient margin on the axis of amplitude. Further, since optical transmissions are by amplitude modulation, it is possible to increase the amount of transmission per fiber while keeping the timing margin, which is almost as wide as possible, mostly unchanged. Further, by controlling the power supply current, etc. in accordance with the characteristic of the light emitting element 32, it is possible to transmit data precisely.

What is claimed is:

1. A signal transmission device that transmits, in form of an optical signal, multivalued data, which shifts through three or more plurality of logical values, comprising:
    a light emitting element that outputs light having an intensity corresponding to a power supply current supplied thereto;
    a current source that is capable of supplying the light emitting element with the power supply current, which has a plurality of current values corresponding to the plurality of values through which the multivalued data shifts; and
    a modulating section that modulates current value of the power supply current supplied from the current source, in response to a shift of the multivalued data, wherein
    the optical signal carrying the multivalued data is generated from an input digital value represented by multiple bits,
    the current source includes a number of bit current sources corresponding to a number of the bits representing the digital value;
    each of the bit current sources generates a current corresponding to a bit position of the bit of the digital value that corresponds thereto,
    the modulating section includes a number of current control switches corresponding to the number of the bits of the digital value, such that the current control switches correspond to the bit current sources, respectively; and
    each of the current control switches between supplying and not supplying the light emitting element with the current generated by the bit current source corresponding thereto, in response to a logical value taken by the bit of the digital value corresponding thereto, the signal transmission device further comprising:
    a measuring section that measures power supply current—output intensity characteristic of the light emitting element; and
    a current control section that controls current value of the power supply current generated by each of the bit current sources, based on the power supply current—output intensity characteristic.

2. The signal transmission device according to claim 1, wherein
    the light emitting element outputs laser light.

3. The signal transmission device according to claim 1, wherein
    the current control section controls current value of the power supply current generated by each current source, such that the intensity of the laser light changes substantially in proportion to an amount by which the multivalued data shifts its logical value.

4. The signal transmission device according to claim 1, further comprising
    a skew adjusting section that reduces skew between paths through which digital values taken by the respective bits of the optical signal carrying the multivalued data are transmitted to the modulating section.

5. The signal transmission device according to claim 1, wherein
    the light emitting element outputs laser light.

6. The signal transmission device according to claim 5, wherein
    the current control section controls current value of the power supply current generated by each current source, such that the intensity of the laser light changes substantially in proportion to an amount by which the multivalued data shifts its logical value.

7. The signal transmission device according to claim 5, further comprising
    a skew adjusting section that reduces skew between paths through which digital values taken by the respective bits of the optical signal carrying the multivalued data are transmitted to the modulating section.

8. The signal transmission device according to claim 5, wherein
    the current control section controls the current generated by each of the bit current sources such that an increase in the intensity of the laser light when the current generated by each of the bit current sources is solely superimposed on the power supply current is substantially linear with respect to an increase of the digital value.

9. The signal transmission device according to claim 8, wherein
    the measuring section measures the power supply current—output intensity characteristic of the light emitting element from the intensity of the laser light corresponding to each of the plurality of current values.

10. The signal transmission device according to claim 1, further comprising
    a skew adjusting section that reduces skew between paths through which digital values taken by the respective bits of the optical signal carrying the multivalued data are transmitted to the modulating section.

11. A test module that is provided in a test device for testing a device under test, and transmits, in form of an optical signal, multivalued data, which shifts through three or more plurality of logical values, comprising:
    a light emitting element that outputs light having an intensity corresponding to a power supply current supplied thereto;
    a current source that is capable of supplying the light emitting element with the power supply current, which has a plurality of current values corresponding to the plurality of values through which the multivalued data shifts; and
    a modulating section that modulates current value of the power supply current supplied from the current source, in response to a shift of the multivalued data, wherein
    the optical signal carrying the multivalued data is generated from an input digital value represented by multiple bits,
    the current source includes a number of bit current sources corresponding to a number of the bits representing the digital value;

each of the bit current sources generates a current corresponding to a bit position of the bit of the digital value that corresponds thereto, the modulating section includes a number of current control switches corresponding to the number of the bits of the digital value, such that the current control switches correspond to the bit current sources, respectively; and each of the current control switches between supplying and not supplying the light emitting element with the current generated by the bit current source corresponding thereto, in response to a logical value taken by the bit of the digital value corresponding thereto, the test module further comprising:

a measuring section that measures power supply current—output intensity characteristic of the light emitting element; and a current control section that controls current value of the power supply current generated by each of the bit current sources, based on the power supply current—output intensity characteristic.

12. The test module according to claim 11, wherein the light emitting element outputs laser light.

13. The test module according to claim 12, wherein the current control section controls current value of the power supply current generated by each current source, such that the intensity of the laser light changes substantially in proportion to an amount by which the multivalued data shifts its logical value.

14. The test module according to claim 12, further comprising
a skew adjusting section that reduces skew between paths through which digital values taken by the respective bits of the optical signal carrying the multivalued data are transmitted to the modulating section.

15. The signal transmission device according to claim 12, wherein
the measuring section measures the power supply current—output intensity characteristic of the light emitting element from the intensity of the laser light corresponding to each of the plurality of current values, and
the current control section controls the current generated by each of the bit current sources such that an increase in the intensity of the laser light when the current generated by each of the bit current sources is solely superimposed on the power supply current is substantially linear with respect to an increase of the digital value.

16. A semiconductor chip that has, on a semiconductor substrate, a signal transmission device that transmits, in form of an optical signal, multivalued data, which shifts through three or more plurality of logical values, wherein
the signal transmission device includes:
a light emitting element that outputs light having an intensity corresponding to a power supply current supplied thereto;
a current source that is capable of supplying the light emitting element with the power supply current, which has a plurality of current values corresponding to the plurality of values through which the multivalued data shifts; and a modulating section that modulates current value of the power supply current supplied from the current source, in response to a shift of the multivalued data, wherein the optical signal carrying the multivalued data is generated from an input digital value represented by multiple bits, the current source includes a number of bit current sources corresponding to a number of the bits representing the digital value;

each of the bit current sources generates a current corresponding to a bit position of the bit of the digital value that corresponds thereto, the modulating section includes a number of current control switches corresponding to the number of the bits of the digital value, such that the current control switches correspond to the bit current sources, respectively;

each of the current control switches between supplying and not supplying the light emitting element with the current generated by the bit current source corresponding thereto, in response to a logical value taken by the bit of the digital value corresponding thereto, and the signal transmission device further includes:
a measuring section that measures power supply current—output intensity characteristic of the light emitting element; and
a current control section that controls current value of the power supply current generated by each of the bit current sources, based on the power supply current—output intensity characteristic.

17. The semiconductor chip according to claim 16, wherein the light emitting element outputs laser light.

18. The semiconductor chip according to claim 17, wherein
the current control section controls current value of the power supply current generated by each current source, such that the intensity of the laser light changes substantially in proportion to an amount by which the multivalued data shifts its logical value.

19. The semiconductor chip according to claim 17, wherein
the signal transmission device further includes
a skew adjusting section that reduces skew between paths through which digital values taken by the respective bits of the optical signal carrying the multivalued data are transmitted to the modulating section.

20. The signal transmission device according to claim 17, wherein
the measuring section measures the power supply current—output intensity characteristic of the light emitting element from the intensity of the laser light corresponding to each of the plurality of current values, and
the current control section controls the current generated by each of the bit current sources such that an increase in the intensity of the laser light when the current generated by each of the bit current sources is solely superimposed on the power supply current is substantially linear with respect to an increase of the digital value.

* * * * *